(12) United States Patent
Steele, Jr. et al.

(10) Patent No.: US 6,826,757 B2
(45) Date of Patent: Nov. 30, 2004

(54) LOCK-FREE IMPLEMENTATION OF CONCURRENT SHARED OBJECT WITH DYNAMIC NODE ALLOCATION AND DISTINGUISHING POINTER VALUE

(75) Inventors: Guy L. Steele, Jr., Lexington, MA (US); Alexander T. Garthwaite, Beverly, MA (US); Paul A. Martin, Arlington, MA (US); Nir N. Shavit, Ramat Aviv (IL); Mark S. Moir, Somerville, MA (US); David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

(21) Appl. No.: 09/837,670

(22) Filed: Apr. 18, 2001

(65) Prior Publication Data

US 2001/0056420 A1 Dec. 27, 2001

Related U.S. Application Data

(63) Continuation-in-part of application No. 09/551,311, filed on Apr. 14, 2000, now abandoned.
(60) Provisional application No. 60/261,633, filed on Jan. 12, 2001.

(51) Int. Cl.$^7$ ................................................ G06F 9/46
(52) U.S. Cl. ........................ 719/314; 719/313; 719/315
(58) Field of Search ................................ 709/314, 313, 709/312; 719/314, 313, 312, 315

(56) References Cited

U.S. PATENT DOCUMENTS

| | | | |
|---|---|---|---|
| 3,686,641 A | 8/1972 | Logan et al. | |
| 3,886,525 A | 5/1975 | Brown et al. | |
| 6,223,335 B1 | 4/2001 | Cartwright, Jr. et al. | ........ 717/1 |
| 6,560,619 B1 | 5/2003 | Flood et al. | |

FOREIGN PATENT DOCUMENTS

| | | |
|---|---|---|
| EP | 0 366 585 A | 5/1990 |
| EP | 0 466 339 A2 | 1/1992 |
| WO | WO 86 00434 A | 1/1986 |

OTHER PUBLICATIONS

Prakash, Sundeep et al. "A Nonblocking Algorithm for Shared Queues Using Compare–and–Swap." IEEE. 1994.*
Michael, Maged et al. "Simple, Fast, and Practical Non–Blocking and Blocking Concurrent Queue Algorithms." ACM. 1996.*
Volois, John D. "Lock–Free Linked Lists Using Compare–and–Swap." ACM. 1995.*
IBM Technical Disclosure Bulletin. "Conditional Multiple Store Instruction." Feb. 1980.*
Shann, Chien–Hua et al. "A practical nonblocking queue algorithm using compare–and–swap". IEEE. 2000.
Farook Mohammad et al. "Managing Long Linked Lists Using Lock Free Techniques." University of Manitoba, Canada.
Blumofe, Robert et al. Verification of a Concurrent Deque Implementation. Jun. 1999.
Turek, John et al. "Locking without Blocking: Making Lock Based Concurrent Data Structure Algorithms Nonblocking." ACM. 1992.

(List continued on next page.)

*Primary Examiner*—Lewis A. Bullock, Jr.
(74) *Attorney, Agent, or Firm*—Zagorin, O'Brien & Graham LLP

(57) ABSTRACT

A novel linked-list-based concurrent shared object implementation has been developed that provides non-blocking and linearizable access to the concurrent shared object. In an application of the underlying techniques to a deque, non-blocking completion of access operations is achieved without restricting concurrency in accessing the deque's two ends. In various realizations in accordance with the present invention, the set of values that may be pushed onto a shared object is not constrained by use of distinguishing values. In addition, an explicit reclamation embodiment facilitates use in environments or applications where automatic reclamation of storage is unavailable or impractical.

38 Claims, 5 Drawing Sheets

OTHER PUBLICATIONS

David L. Detlefs et al., "Even Better DCAS–Based Concurrent Deques," 14th International Conference, Disc 2000. Proceedings (Lecture Notes in Computer Science, vol. 1914), Distributed Computing, Toledo, Spain, Oct. 4–6, 2000, Online, pp. 29–73, XP002172096, 2000, Springer–Verlag, Berlin, Germany, ISBN: 3–540–41143–7, [Retrieved from the Internet on Jul. 13, 2001: URL:http://research.sun.com/jtech/subs/00–deque2.ps].

U.S. application Ser. No. 09/547,290, entitled Maintaining a Double–Ended Queue as a Linked–List With Sentinel Nodes and Delete Flags With Concurrent Non–Blocking Insert and Remove Operations Using a Double Compare–and–Swap Primitive, filed Apr. 11, 2000, by inventor(s) Nir N. Shavit, Paul A. Martin, and Guy L. Steele Jr.

U.S. application Ser. No. 09/551,113, entitled Concurrent Shared Object Implemented Using a Linked List With Amortized Node Allocation, filed Apr. 18, 2000, by inventor(s) Paul A. Martin, David L. Detlefs, Alexander T. Garthwaite, and Guy L. Steele Jr.

U.S. application Ser. No. 09/547,288, entitled Maintaining a Double–Ended Queue in a Contiguous Array With Concurrent Non–Blocking Insert and Remove Operations Using a Double Compare–and–Swap Primitive, filed Apr. 11, 2000, by inventor(s) Nir N. Shavit, Ole Agesen, David L. Detlefs, Christine H. Flood, Alexander T. Garthwaite, Paul A. Martin, and Guy L. Steele Jr.

Y. Afek, M. Merritt, G. Taubenfeld, and D. Touitou, "Disentangling Multi–Object Operations," *Proceedings of the 16th Annual ACM Symposium on Principles of Distributed Computing*, pp. 111–120, Aug. 1997. Santa Barbara, CA.

N. S. Arora, Blumofe, and C. G. Plaxton. "Thread Scheduling For Multiprogrammed Multiprocessors," *Proceedings of the 10th Annual ACM Symposium on Parallel Algorithms and Architectures*, 1998.

H. Attiya and E. Dagan. "Universal Operations: Unary versus Binary," *Proceedings of the 15th Annual ACM Symposium on Principles of Distributed Computing*, 11 pages, May 23–26 1996. Phila. PA.

Hagit Attiya, Nancy Lynch, and Nir Shavit. "Are Wait–Free Algorithms Fast?" *Journal of the ACM*, 41(4):725–763, pp. 223–232, Jul. 1994.

G. Barnes. "A Method For Implementing Lock–Free Shared Data Structures," *Proceedings of the 5th ACM Symposium on Parallel Algorithms and Architectures*, pp. 261–270, Jun. 1993.

B. N. Bershad. "Practical Considerations For Non–Blocking Concurrent Objects," *Proceedings 13th IEEE International Conference on Distributed Computing Systems*, pp. 264–273. IEEE Computer Society Press, May 25–28 1993. Los Alamitos CA.

M. Greenwald. "Non–Blocking Synchronization and System Design," PhD thesis, Stanford University Technical Report STAN–CS–TR–99–1624, 241 pages, Palo Alto, CA, 8 1999.

M. B. Greenwald and D. R. Cheriton. "The Synergy Between Non–Blocking Synchronization And Operating System Structure," *2nd Symposium on Operating Systems Design and Implementation*, pp. 123–136, Oct. 28–31 1996. Seattle, WA.

M. Herlihy. "A Methodology for Implementing Highly Concurrent Data Objects," *ACM Transactions on Programming Languages and Systems*, 15(5):745–770, Nov. 1993.

M. Herlihy and J. Moss. "Transactional memory: Architectural Support For Lock–Free Data Structures," *Technical Report CRL 92/07*, Digital Equipment Corporation, 12 pages, Cambridge Research Lab, 1992.

M.P. Herlihy, "Wait–Free Synchronization," *ACM Transactions On Programming Languages and Systems*, 13(1):124–149, Jan. 1991.

M.P. Herlihy and J.M. Wing. "Linearizability: A Correctness Condition For Con–Current Objects," *ACM Transactions On Programming Languages and Systems*, 12(3):463–492, Jul. 1990.

H. Massalin and C. Pu. "A Lock–Free Multiprocessor OS Kernel," *Technical Report TR CUCS–005–9*, pp. 1–19, Columbia University, New York, NY, 1991.

H. Massalin, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 1992: pp. 1–149, XP002172093 [retrieved from the Internet on Jul. 13, 2001: URL: ftp://ftp.cs.columbia.edu/reports/reports–1992/cucs–039–92.ps.gz].

Martin C. Rinard, "Effective Fine–Grain Synchronization for Automatically Parallelized Programs Using Optimistic Synchronization Primitives," *ACM Trans. Computer Systems*, 17(4):337–371, Nov. 1999.

N. Shavit and D. Touitou. "Software Transactional Memory," *Distributed Computing*, 10(2):99–116, Feb. 1997.

Hagit Attiya and Ophir Rachman, "Atomic Snapshots in 0 (n log n) Operations," Society for Industrial and Applied Mathematics, SIAM Journal on Computing, Apr. 1998, vol. 27, No. 2, pp. 319–340.

Agesen, Ole, et al.: "DCAS–Based Concurrent Deques," SPAA 2000. 12th Annual ACM Symposium on Parallel Algorithms and Architectures, Bar Harbor, ME, Jul. 9–12, 2000, Annual ACM Symposium on Parallel Algorithms and Architectures, New York, NY: ACM, US, Jul. 9, 2000, XP002172095, ISBN: 1–58113–185–2, pp. 137–146.

Weiss, Mark Allen, *Data Structures & Algorithm Analysis in C++*, Second Edition, Reading, Mass., Addison–Wesley, 1999, Chapter 3.

Comer, Douglas, *Operating System Design: The Xinu Approach*, Englewood Cliffs, New Jersey, Prentice–Hall, Inc., 1984, Chapter 3.

Patterson, David A. and Hennessy, John L., Computer Architecture: A Quantitative Approach, Second Edition, San Francisco, California, Morgan Kaufman Publishers, Inc., 1996, pp. 485–495 and 562–572.

Cohoon, James P. and Davidson, Jack W., *C++ Program Design: An Introduction to Programming and Object–Oriented Design*, Second Edition, New York, New York, WCB/McGraw–Hill, 1999, pp. 465–502.

Stroustrup, Bjarne, The C++ Programming Language, Third Edition, Reading, Mass., Addison–Wesley, 1997, pp. 461–497.

Ole Agessen et al., "*DCAS–Based Concurrent Deques*", Oct. 2002, pp. 137–146.

David, L. Detlefs et al., "*Even Better DCAS–Based Concurrent Deques*", DISC 2000, pp. 59–73.

Paul Martin et al., "*DCAS–Based Concurrent Deques Supporting Bulk Allocation*", Sun Microsystems, Inc. Technical Report, Oct. 2002.

Henry Massalin, *Synthesis: An Efficient Implementation of Fundamental Operating System Services*, Dissertation, Columbia University, New York, 1992, pp. 1–142 (retrieved from the internet on Jul. 13, 2001).

IBM, "*Enqueue Top for Recovery*", Jun. 1981.

IBM, "*Double–Threaded Enqueue Without Serialization*", Jun. 1982.

IBM, "*Single Thread ENQ/Double Thread DEQ of FIFO Queue*", Jun. 1982.

U.S. application Ser. No. 09/551,311, entitled Shared Object Implemented Using A Linked–List Technique That Tolerates Certain Concurrent Opposing–End Removals Using a Distinguishing Pointer Value, filed Apr. 18, 2000, by inventors Guy L. Steele Jr. et al.

\* cited by examiner

LeftHat ⓞ  ⓞ RightHat
*FIG. 2A*
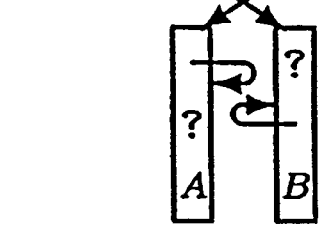
*FIG. 2B*
LeftHat ⚪ ⓞ RightHat
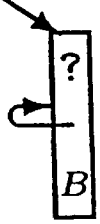
*FIG. 2C*
LeftHat ⓞ ⚪ RightHat
*FIG. 2D*

LOCK-FREE IMPLEMENTATION OF CONCURRENT SHARED OBJECT WITH DYNAMIC NODE ALLOCATION AND DISTINGUISHING POINTER VALUE

CROSS-REFERENCE TO RELATED APPLICATION(S)

This application is a continuation-in-part of U.S. application Ser. No. 09/551,311, filed Apr. 18, 2000 now abandoned, and claims benefit of U.S. Provisional Application No. 60/261,633, filed Jan. 12, 2001.

In addition, this application is related to U.S. patent application Ser. No. 09/837,671, still pending, entitled "LOCK FREE REFERENCE COUNTING," naming David L. Detlefs, Paul A. Martin, Mark S. Moir, and Guy L. Steele Jr. as inventors, and filed on even date herewith.

BACKGROUND OF THE INVENTION

1. Field of the Invention

The present invention relates generally to coordination amongst execution sequences in a multiprocessor computer, and more particularly, to structures and techniques for facilitating non-blocking access to concurrent shared objects.

2. Description of the Related Art

An important abstract data structure in computer science is the "double-ended queue" (abbreviated "deque" and pronounced "deck"), which is a linear sequence of items, usually initially empty, that supports the four operations of inserting an item at the left-hand end ("left push"), removing an item from the left-hand end ("left pop"), inserting an item at the right-hand end ("right push"), and removing an item from the right-hand end ("right pop").

Sometimes an implementation of such a data structure is shared among multiple concurrent processes, thereby allowing communication among the processes. It is desirable that the data structure implementation behave in a linearizable fashion; that is, as if the operations that are requested by various processes are performed atomically in some sequential order.

One way to achieve this property is with a mutual exclusion lock (sometimes called a semaphore). For example, when any process issues a request to perform one of the four deque operations, the first action is to acquire the lock, which has the property that only one process may own it at a time. Once the lock is acquired, the operation is performed on the sequential list; only after the operation has been completed is the lock released. This clearly enforces the property of linearizability.

However, it is generally desirable for operations on the left-hand end of the deque to interfere as little as possible with operations on the right-hand end of the deque. Using a mutual exclusion lock as described above, it is impossible for a request for an operation on the right-hand end of the deque to make any progress while the deque is locked for the purposes of performing an operation on the left-hand end. Ideally, operations on one end of the deque would never impede operations on the other end of the deque unless the deque were nearly empty (containing two items or fewer) or, in some implementations, nearly full.

In some computational systems, processes may proceed at very different rates of execution; in particular, some processes may be suspended indefinitely. In such circumstances, it is highly desirable for the implementation of a deque to be "non-blocking" (also called "lock-free"); that is, if a set of processes are using a deque and an arbitrary subset of those processes are suspended indefinitely, it is always still possible for at least one of the remaining processes to make progress in performing operations on the deque.

Certain computer systems provide primitive instructions or operations that perform compound operations on memory in a linearizable form (as if atomically). The VAX computer, for example, provided instructions to directly support the four deque operations. Most computers or processor architectures provide simpler operations, such as "test-and-set"; (IBM 360), "fetch-and-add" (NYU Ultracomputer), or "compare-and-swap" (SPARC). SPARC® architecture based processors are available from Sun Microsystems, Inc., Mountain View, Calif. SPARC trademarks are used under license and are trademarks or registered trademarks of SPARC International, Inc. in the United States and other countries. Products bearing SPARC trademarks are based upon an architecture developed by Sun Microsystems.

The "compare-and-swap" operation (CAS) typically accepts three values or quantities: a memory address A, a comparison value C, and a new value N. The operation fetches and examines the contents V of memory at address A. If those contents V are equal to C, then N is stored into the memory location at address A, replacing V. Whether or not V matches C, V is returned or saved in a register for later inspection. All this is implemented in a linearizable, if not atomic, fashion. Such an operation may be notated as "CAS(A, C, N)".

Non-blocking algorithms can deliver significant performance benefits to parallel systems. However, there is a growing realization that existing synchronization operations on single memory locations, such as compare-and-swap (CAS), are not expressive enough to support design of efficient non-blocking algorithms. As a result, stronger synchronization operations are often desired. One candidate among such operations is a double-word ("extended") compare-and-swap (implemented as a CASX instruction in some versions of the SPARC architecture), which is simply a CAS that uses operands of two words in length. It thus operates on two memory addresses, but they are constrained to be adjacent to one another. A more powerful and convenient operation is "double compare-and-swap" (DCAS), which accepts six values: memory addresses A1 and A2, comparison values C1 and C2, and new values N1 and N2. The operation fetches and examines the contents V1 of memory at address A1 and the contents V2 of memory at address A2. If V1 equals C1 and V2 equals C2, then N1 is stored into the memory location at address A1, replacing V1, and N2 is stored into the memory location at address A2, replacing V2. Whether or not V1 matches C1 and whether or not V2 matches C2, V1 and V2 are returned or saved in a registers for later inspection. All this is implemented in a linearizable, if not atomic, fashion. Such an operation may be notated as "DCAS(A1, A2, C1, C2, N1, N2)".

Massalin and Pu disclose a collection of DCAS-based concurrent algorithms. See e.g., H. Massalin and C. Pu, A Lock-Free Multiprocessor O S Kernel, Technical Report TR CUCS-005-9, Columbia University, New York, N.Y., 1991, pages 1–19. In particular, Massalin and Pu disclose a lock-free operating system kernel based on the DCAS operation offered by the Motorola 68040 processor, implementing structures such as stacks, FIFO-queues, and linked lists. Unfortunately, the disclosed algorithms are centralized in nature. In particular, the DCAS is used to control a memory location common to all operations and therefore limits overall concurrency.

Greenwald discloses a collection of DCAS-based concurrent data structures that improve on those of Massalin and Pu. See e.g., M. Greenwald. Non-Blocking Synchronization and System Design, Ph.D. thesis, Stanford University Technical Report STAN-CS-TR-99-1624, Palo Alto, Calif., 8 1999, 241 pages. In particular, Greenwald discloses implementations of the DCAS operation in software and hardware and discloses two DCAS-based concurrent double-ended queue (deque) algorithms implemented using an array. Unfortunately, Greenwald's algorithms use DCAS in a restrictive way. The first, described in Greenwald, Non-Blocking Synchronization and System Design, at pages 196–197, uses a two-word DCAS as if it were a three-word operation, storing two deque end pointers in the same memory word, and performing the DCAS operation on the two-pointer word and a second word containing a value. Apart from the fact that Greenwald's algorithm limits applicability by cutting the index range to half a memory word, it also prevents concurrent access to the two ends of the deque. Greenwald's second algorithm, described in Greenwald, Non-Blocking Synchronization and System Design, at pages 217–220, assumes an array of unbounded size, and does not deal with classical array-based issues such as detection of when the deque is empty or full.

Arora et al. disclose a CAS-based deque with applications in job-stealing algorithms. See e.g., N. S. Arora, Blumofe, and C. G. Plaxton, Thread Scheduling For Multiprogrammed Multiprocessors, in Proceedings of the 10th Annual ACM Symposium on Parallel Algorithms and Architectures, 1998. Unfortunately, the disclosed non-blocking implementation restricts one end of the deque to access by only a single processor and restricts the other end to only pop operations.

Accordingly, improved techniques are desired that provide linearizable and non-blocking (or lock-free) behavior for implementations of concurrent shared objects such as a deque, and which do not suffer from the above-described drawbacks of prior approaches.

SUMMARY OF THE INVENTION

A set of structures and techniques are described herein whereby an exemplary concurrent shared object, namely a double-ended queue (deque), is implemented. Although non-blocking, linearizable deque implementations exemplify several advantages of realizations in accordance with the present invention, the present invention is not limited thereto. Indeed, based on the description herein and the claims that follow, persons of ordinary skill in the art will appreciate a variety of concurrent shared object implementations. For example, although the described deque implementations exemplify support for concurrent push and pop operations at both ends thereof, other concurrent shared objects implementations in which concurrency requirements are less severe, such as LIFO or stack structures and FIFO or queue structures, may also be implemented using the techniques described herein. Accordingly, subsets of the functional sequences and techniques described herein for exemplary deque realizations may be employed to support any of these simpler structures.

Furthermore, although various non-blocking, linearizable deque implementations described herein employ a particular synchronization primitive, namely a double compare and swap (DCAS) operation, the present invention is not limited to DCAS-based realizations. Indeed, a variety of synchronization primitives may be employed that allow linearizable, if not atomic, update of at least a pair of storage locations. In general, N-way Compare and Swap (NCAS) operations (N≧2) or transactional memory may be employed.

Choice of an appropriate synchronization primitive is typically affected by the set of alternatives available in a given computational system. While direct hardware- or architectural-support for a particular primitive is preferred, software emulations that build upon an available set of primitives may also be suitable for a given implementation. Accordingly, any synchronization primitive that allows access operations to be implemented with substantially equivalent semantics to those described herein is suitable.

Accordingly, a novel linked-list-based concurrent shared object implementation has been developed that provides non-blocking and linearizable access to the concurrent shared object. In an application of the underlying techniques to a deque, non-blocking completion of access operations is achieved without restricting concurrency in accessing the deque's two ends. In various realizations in accordance with the present invention, the set of values that may be pushed onto a shared object is not constrained by use of distinguishing values. In addition, an explicit reclamation embodiment facilitates use in environments or applications where automatic reclamation of storage is unavailable or impractical.

BRIEF DESCRIPTION OF THE DRAWINGS

The present invention may be better understood, and its numerous objects, features, and advantages made apparent to those skilled in the art by referencing the accompanying drawings.

FIG. 1A depicts an illustrative state after push operations at both ends of the deque. FIG. 1B depicts an illustrative state after pop operations at both ends of the deque. FIG. 1C depicts an illustrative state after a pop operation at a left end of the deque and a push operation at a right end of the deque. Finally, FIG. 1D depicts an illustrative state after a push operation at a left end of the deque and a pop operation at a right end of the deque.

FIGS. 2A, 2B, 2C and 2D depict several states of a linked-list structure encoding an empty double-ended queue (deque) in accordance with an exemplary embodiment of the present invention. In particular, FIG. 2A depicts an empty state. FIG. 2B depicts a logically empty state that may result from concurrent execution of pop operations at opposing ends of a deque implemented in accordance with an exemplary embodiment of the present invention. Finally, FIGS. 2C and 2D depict logically empty states that may arise in some embodiments in accordance with the present invention. Other empty deque state encodings are described elsewhere herein.

The use of the same reference symbols in different drawings indicates similar or identical items.

DESCRIPTION OF THE PREFERRED EMBODIMENT(S)

Figure 1A:
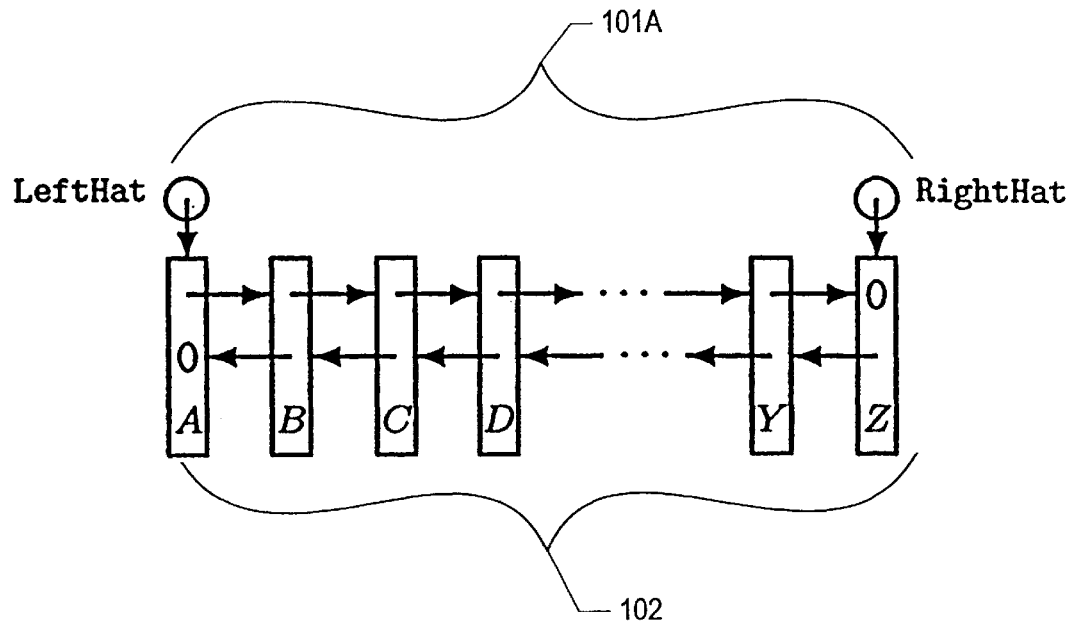
FIGS. 1A, 1B, 1C and 1D depict several states of a linked-list structure encoding a double-ended queue (deque) in accordance with an exemplary embodiment of the present invention. In particular.

The description that follows presents a set of techniques, objects, functional sequences and data structures associated with concurrent shared object implementations employing linearizable synchronization operations in accordance with an exemplary embodiment of the present invention. An exemplary non-blocking, linearizable concurrent double-ended queue (deque) implementation that employs double compare-and-swap (DCAS) operations is illustrative. A deque is a good exemplary concurrent shared object implementation in that it involves all the intricacies of LIFO-stacks and FIFO-queues, with the added complexity of handling operations originating at both of the deque's ends. Accordingly, techniques, objects, functional sequences and data structures presented in the context of a concurrent deque implementation will be understood by persons of ordinary skill in the art to describe a superset of support and functionality suitable for less challenging concurrent shared object implementations, such as LIFO-stacks, FIFO-queues or concurrent shared objects (including deques) with simplified access semantics.

In view of the above, and without limitation, the description that follows focuses on an exemplary linearizable, non-blocking concurrent deque implementation that behaves as if access operations on the deque are executed in a mutually exclusive manner, despite the absence of a mutual exclusion mechanism. Advantageously, and unlike prior approaches, deque implementations in accordance with some embodiments of the present invention allow concurrent operations on the two ends of the deque to proceed independently. Since synchronization operations are relatively slow and/or impose overhead, it is generally desirable to minimize their use. Accordingly, one advantage of some implementations in accordance with the present invention is that in typical execution paths, access operations require only a single synchronization operation.

Computational Model

One realization of the present invention is as a deque implementation employing the DCAS operation on a shared memory multiprocessor computer. This realization, as well as others, will be understood in the context of the following computation model, which specifies the concurrent semantics of the deque data structure.

In general, a concurrent system consists of a collection of n processors. Processors communicate through shared data structures called objects. Each object has an associated set of primitive operations that provide the mechanism for manipulating that object. Each processor P can be viewed in an abstract sense as a sequential thread of control that applies a sequence of operations to objects by issuing an invocation and receiving the associated response. A history is a sequence of invocations and responses of some system execution. Each history induces a "real-time" order of operations where an operation A precedes another operation B, if A's response occurs before B's invocation. Two operations are concurrent if they are unrelated by the real-time order. A sequential history is a history in which each invocation is followed immediately by its corresponding response. The sequential specification of an object is the set of legal sequential histories associated with it. The basic correctness requirement for a concurrent implementation is linearizability. Every concurrent history is "equivalent" to some legal sequential history which is consistent with the real-time order induced by the concurrent history. In a linearizable implementation, an operation appears to take effect atomically at some point between its invocation and response. In the model described herein, the collection of shared memory locations of a multiprocessor computer's memory (including location L) is a linearizable implementation of an object that provides each processor $P_i$ with the following set of sequentially specified machine operations:

$Read_i(L)$ reads location L and returns its value.

$Write_i(L,v)$ writes the value v to location L.

$DCAS_i(L1, L2, o1, o2, n1, n2)$ is a double compare-and-swap operation with the semantics described below.

Implementations described herein are non-blocking (also called lock-free). Let us use the term higher-level operations in referring to operations of the data type being implemented, and lower-level operations in referring to the (machine) operations in terms of which it is implemented. A non-blocking implementation is one in which, even though individual higher-level operations may be delayed, the system as a whole continuously makes progress. More formally, a non-blocking implementation is one in which any infinite history containing a higher-level operation that has an invocation but no response must also contain infinitely many responses. In other words, if some processor performing a higher-level operation continuously takes steps and does not complete, it must be because some operations invoked by other processors are continuously completing their responses. This definition guarantees that the system as a whole makes progress and that individual processors cannot be blocked, only delayed by other processors continuously taking steps. Using locks would violate the above condition, hence the alternate name: lock-free.

Double Compare-and-Swap Operation

Double compare-and-swap (DCAS) operations are well known in the art and have been implemented in hardware, such as in the Motorola 68040 processor, as well as through software emulation. Accordingly, a variety of suitable implementations exist and the descriptive code that follows is meant to facilitate later description of concurrent shared object implementations in accordance with the present invention and not to limit the set of suitable DCAS implementations. For example, order of operations is merely illustrative and any implementation with substantially equivalent semantics is also suitable. Similarly, some formulations (such as described above) may return previous values while others may return success/failure indications. The illustrative formulation that follows is of the latter type. In general, any of a variety of formulations are suitable.

```
boolean DCAS(val *addrl, val *addr2,
        val old1, val old2,
        val new1, val new2) {
    atomically {
        if ((*addr1==old1) && (*addr2==old2)) {
            *addrl = new1;
            *addr2 = new2;
            return true;
        } else {
            return false;
        }
    }
}
```

The above sequence of operations implementing the DCAS operation are executed atomically using support suitable to the particular realization. For example, in various realizations, through hardware support (e.g., as implemented by the Motorola 68040 microprocessor or as described in M. Herlihy and J. Moss, Transactional memory: Architectural Support For Lock-Free Data Structures, Technical Report CRL 92/07, Digital Equipment Corporation, Cambridge Research Lab, 1992, 12 pages), through non-blocking software emulation (such as described in G. Barnes, A Method For Implementing Lock-Free Shared Data Structures, in Proceedings of the 5th ACM Symposium on Parallel Algorithms and Architectures, pages 261–270, June 1993 or in N. Shavit and D. Touitou, Software transactional memory, Distributed Computing, 10(2):99–116, February 1997), or via a blocking software emulation (such as described in U.S. patent application Ser. No. 09/207,940, entitled "PLATFORM INDEPENDENT DOUBLE COMPARE AND SWAP OPERATION," naming Cartwright and Agesen as inventors, and filed Dec. 9, 1998).

Although the above-referenced implementation is presently preferred, other DCAS implementations that substantially preserve the semantics of the descriptive code (above) are also suitable. Furthermore, although much of the description herein is focused on double compare-and-swap (DCAS) operations, it will be understood that other synchronization operations such as N-location compare-and-swap operations (N≧2) or transactional memory may be more generally employed.

A Double-ended Queue (Deque)

A deque object S is a concurrent shared object, that in an exemplary realization is created by an operation of a constructor operation, e.g., make_deque( ), and which allows each processor $P_i$, $0 \leq i \leq n-1$, of a concurrent system to perform the following types of operations on S: push_right$_i$(v), push_left$_i$(v), pop_right$_i$( ), and pop_left$_i$( ). Each push operation has an input, v, where v is selected from a range of values. Each pop operation returns an output from the range of values. Push operations on a full deque object and pop operations on an empty deque object return appropriate indications. In the case of a dynamically sized deque, "full" refers to the case where the deque is observed to have no available nodes to accommodate a push and the system storage allocator reports that no more storage is available to the process.

A concurrent implementation of a deque object is one that is linearizable to a standard sequential deque. This sequential deque can be specified using a state-machine representation that captures all of its allowable sequential histories. These sequential histories include all sequences of push and pop operations induced by the state machine representation, but do not include the actual states of the machine. In the following description, we abuse notation slightly for the sake of clarity.

The state of a deque is a sequence of items $S=<v_0, \ldots, v_k>$ from the range of values, having cardinality $0 \leq |S| \leq max\_length\_S$. The deque is initially in the empty state (following invocation of make_deque ( )), that is, has cardinality 0, and is said to have reached a full state if its cardinality is max_length_S. In general, for deque implementations described herein, cardinality is unbounded except by limitations (if any) of an underlying storage allocator.

The four possible push and pop operations, executed sequentially, induce the following state transitions of the sequence $S=<v_0, \ldots, v_k>$, with appropriate returned values:

push_right($v_{new}$) if S is not full, sets S to be the sequence
$S=<v_0, \ldots, v_k, v_{new}>$
push_left($v_{new}$) if S is not full, sets S to be the sequence
$S=<v_{new}, v_0, \ldots, v_k>$
pop_right( ) if S is not empty, sets S to be the sequence
$S=<v_0, \ldots, v_{k-1}>$ and returns the item, $v_k$.
pop_left( ) if S is not empty, sets S to be the sequence
$S=<v_1, \ldots, v_k>$ and returns the item $v_0$.

For example, starting with an empty deque state, S=< >, the following sequence of operations and corresponding transitions can occur. A push_right(1) changes the deque state to S=<1>. A push_left(2) subsequently changes the deque state to S=<2,1>. A subsequent push_right(3) changes the deque state to S=<2,1,3>. Finally, a subsequent pop_right( ) changes the deque state to S=<2,1> and returns the value, 3. In some implementations, return values may be employed to indicate success or failure.

Storage Reclamation

Many programming languages and execution environments have traditionally placed responsibility for dynamic allocation and deallocation of memory on the programmer. For example, in the C programming language, memory is allocated from the heap by the malloc procedure (or its variants). Given a pointer variable, p, execution of machine instructions corresponding to the statement p=malloc (sizeof (SomeStruct)) causes pointer variable p to point to newly allocated storage for a memory object of size necessary for representing a SomeStruct data structure. After use, the memory object identified by pointer variable p can be deallocated, or freed, by calling free (p). Other languages provide analogous facilities for explicit allocation and deallocation of memory.

Unfortunately, dynamically allocated storage becomes unreachable when no chain of references (or pointers) can be traced from a "root set" of references (or pointers) to the storage. Memory objects that are no longer reachable, but have not been freed, are called garbage. Similarly, storage associated with a memory object can be deallocated while still referenced. In this case, a dangling reference has been created. In general, dynamic memory can be hard to manage correctly. Because of this difficulty, garbage collection, i.e., automatic reclamation of dynamically allocated storage, can be an attractive model of memory management. Garbage collection is particularly attractive for languages such as the JAVA™ language (JAVA and all Java-based marks and logos are trademarks or registered trademarks of Sun Microsystems, Inc. in the United States and other countries), Prolog, Lisp, Smalltalk, Scheme, Eiffel, Dylan, ML, Haskell, Miranda, Oberon, etc. See generally, Jones & Lins, Garbage Collection: Algorithms for Automatic Dynamic Memory Management, pp. 1–41, Wiley (1996) for a discussion of garbage collection and of various algorithms and implementations for performing garbage collection.

In general, the availability of particular memory management facilities are language, implementation and execution environment dependent. Accordingly, for some realizations in accordance with the present invention, it is acceptable to assume that storage is managed by a "garbage collector" that returns (to a "free pool") that storage for which it can be proven that no process will, in the future, access data structures contained therein. Such a storage management scheme allows operations on a concurrent shared object, such as a deque, to simply eliminate references or pointers to a removed data structure and rely upon operation of the garbage collector for automatic reclamation of the associated storage.

However, for some realizations, a garbage collection facility may be unavailable or impractical. For example, one realization in which automatic reclamation may be unavailable or impractical is a concurrent shared object implementation (e.g., a deque) employed in the implementation of a garbage collector itself. Accordingly, in some realizations in accordance with the present invention, storage is explicitly reclaimed or "freed" when no longer used. For example, in some realizations, removal operations include explicit reclamation of the removed storage.

Linked-List-based Deque Implementation

One embodiment in accordance with the present invention includes a linked-list-based implementation of a lock-free double-ended queue (deque). The implementation includes both structures (e.g., embodied as data structures in memory and/or other storage) and techniques (e.g., embodied as operations, functional sequences, instructions, etc.) that facilitate concurrent, non-blocking shared access. The exemplary implementation employs double compare and swap (DCAS) operations to provide linearizable behavior. However, as described elsewhere herein, other synchronization primitives may be employed in other realizations. In general, the exemplary implementation exhibits a number of features that tend to improve its performance:

a) Access operations (e.g., push and pop operations) at opposing left and right ends of the deque do not interfere with each other except when the deque is either empty or contains only a single node.

b) The number of DCAS calls is 1 per uncontended push or pop operation.

c) A full storage width DCAS primitive that operates on two independently-addressable storage units may be employed. Accordingly, full storage width is available for addresses or data and tag bits need not be set aside.

d) The set of values that may be pushed onto the deque is not limited by use of special values to mark nodes of the linked-list.

e) Explicit reclamation may be provided in some realizations.

Although all of these features is provided in some realizations, fewer than all may be provided in others.

The organization and structure of a doubly-linked-list and deque encoded therein are now described with reference to FIGS. 1A, 1B, 1C and 1D. In general, individual elements of the linked-list can be represented as instances of a simple node structure. For example, in one realization, nodes are implemented in accordance with the following definition:

```
typedef Node {
    Node *R;
    Node *L;
    val V;
}
Node *LeftHat = null;
Node *RightHat = null;
```

Each node encodes two link pointers, R and L, and a value, V. There are two global "anchor" variables, or hats, called LeftHat and RightHat, which generally point to the leftmost node and the rightmost node in the doubly linked chain.

A linked-list 101A of such nodes is illustrated in FIG. 1A. Linked-list 101A encodes a deque 102 with a state corresponding to the sequence, S=<A, B, C, D, . . . , Y, Z>. Elements of the sequence are encoded as values in V fields of respective nodes of linked-list 101A. In general, the value field of the illustrated structure may include a literal value or a pointer value. Particular data structures identified by pointer values are, in general, application specific. Literal values may be appropriate for some applications, while in others, more complex node structures may be employed. Based on the description herein, these and other variations will be appreciated by persons of ordinary skill in the art. Nonetheless, and without loss of generality, the simple node structure defined above is used for purposes of illustration.

As a general rule, the V field of the node pointed to by LeftHat is the leftmost item in the deque and the V field of the node pointed to by RightHat is the rightmost item in the deque. If both hats contain null pointers, then the deque is empty. Contents of the L field of the node to which LeftHat points generally do not matter, e.g., the L field of such a node may be null or may point to another node. However, we have a special rule, whose significance will be understood in the context of the description that follows, that if LeftHat points to a node whose L field points to that same node (in which case we say that the L field contains a self-pointer), then the queue is logically empty and the V field of that node is not an item in the deque. Similarly, contents of the R field of the node to which RightHat points generally do not matter, e.g., the R field of such a node may be null or may point to another node. Again, we have the special rule, that if RightHat points to a node whose R field points to that same node (in which case we say that the R field contains a self-pointer), then the queue is logically empty and the V field of that node is not an item in the deque. Once an L field or an R field contains a self-pointer, that field is not changed again (until the node is determined to be inaccessible and therefore eligible to be reclaimed).

Figure 1B:
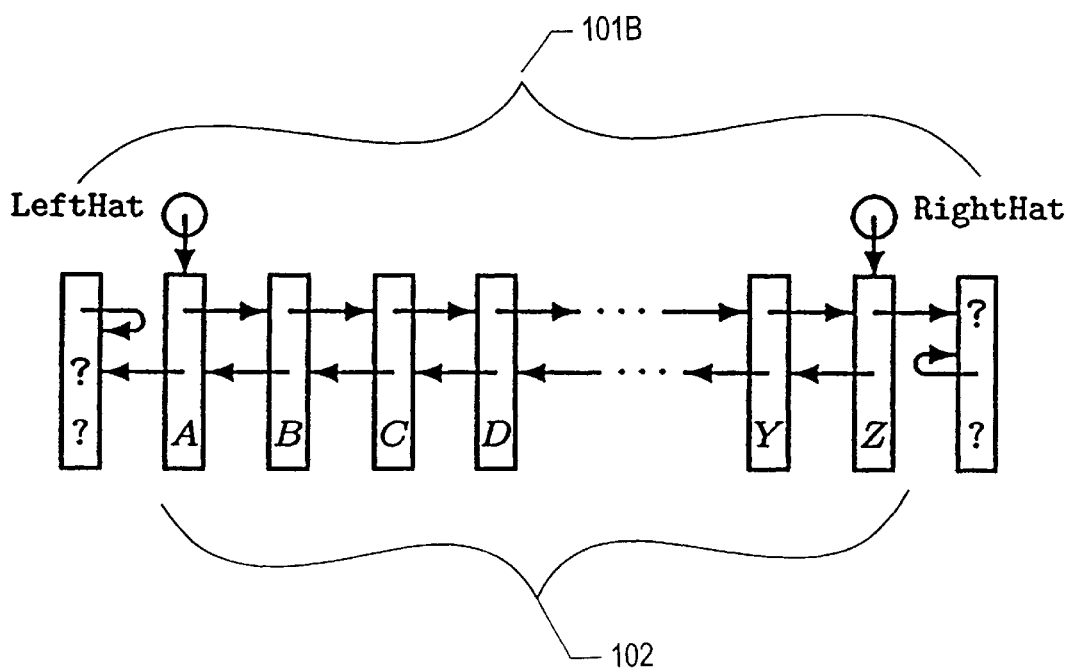
Figure 1C:
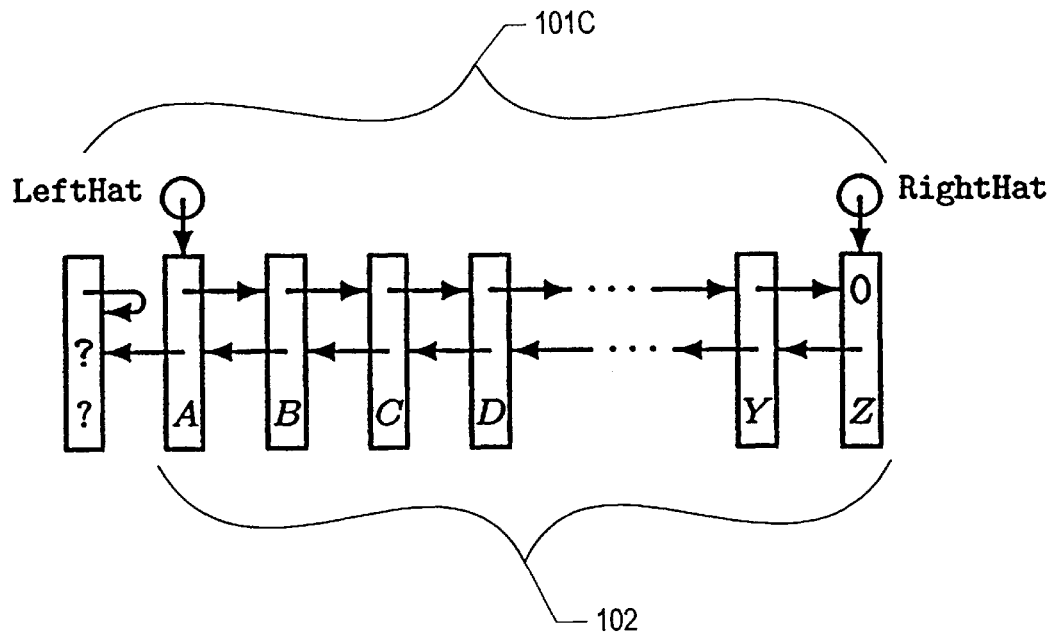
Figure 1D:
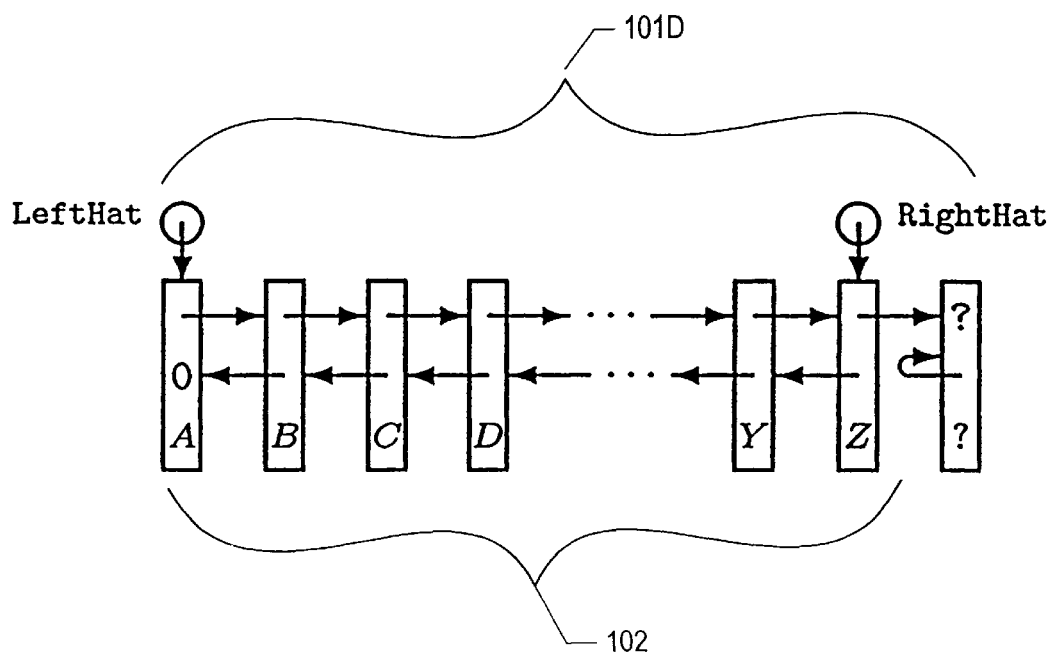
Figure 3A:
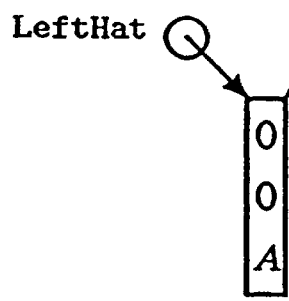
FIGS. 3A, 3B, 3C and 3D depict several states of a linked-list structure encoding a single-element double-ended queue (deque) in accordance with an exemplary embodiment of the present invention.
Figure 3B:
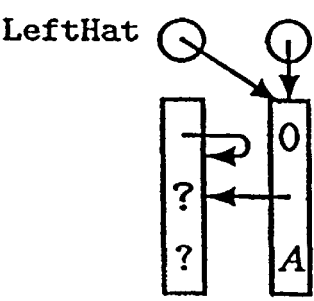
Figure 3C:
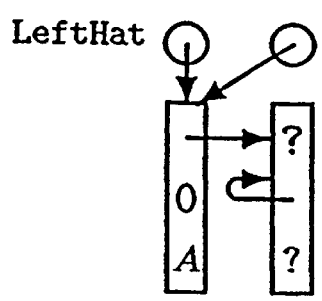
Figure 3D:
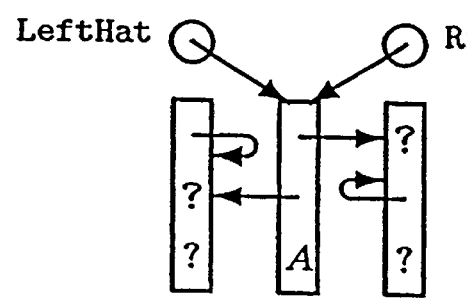
Figure 4A:
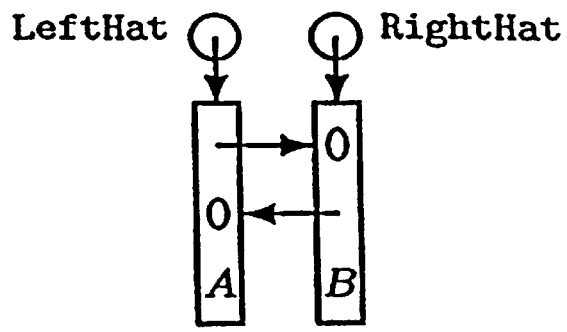
FIGS. 4A, 4B, 4C and 4D depict several states of a linked-list structure encoding a two-element double-ended queue (deque) in accordance with an exemplary embodiment of the present invention.
Figure 4B:
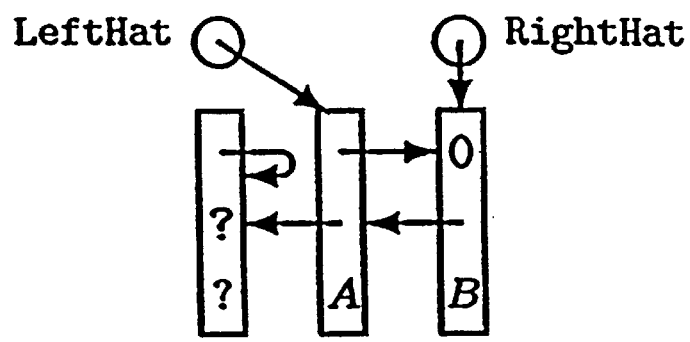
Figure 4C:
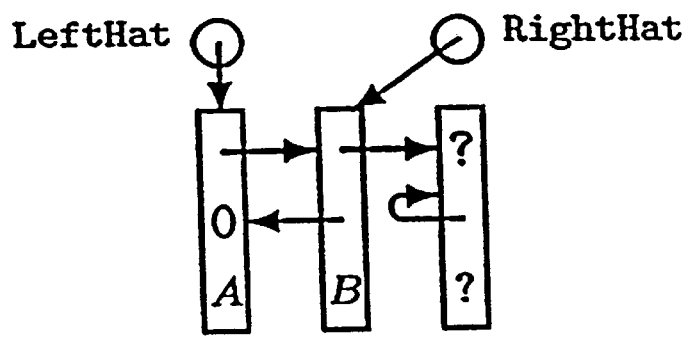
Figure 4D:
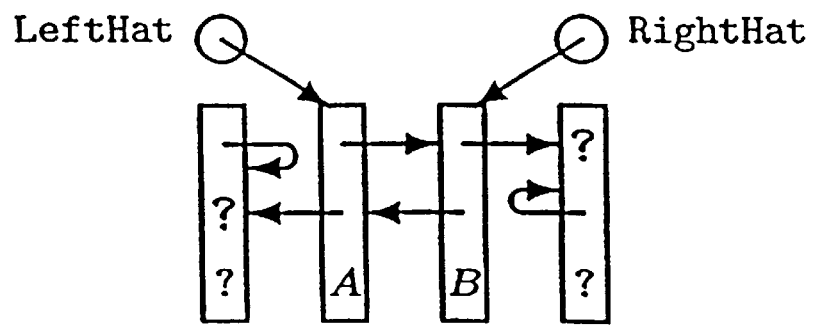

FIGS. 1A, 1B, 1C and 1D illustrate various alternate encodings of deque 102 in accordance with the above and which will be better understood in the context of push and pop operation descriptions that follow. In particular, FIG. 1A illustrates a linked-list 101A state encoding deque 102 after successful push operations at each end thereof. FIG. 1B illustrates a linked-list 101B state encoding deque 102 after successful pop operations at each end thereof. FIG. 1C illustrates a linked-list 101C state encoding deque 102 after successful left pop and right push operations. FIG. 1D illustrates a linked-list 101D state encoding deque 102 after successful left push and right pop operations.

FIGS. 2A, 2B, 2C and 2D illustrate another set of corresponding linked-list and deque states, namely those corresponding to an empty deque. One encoding of an empty deque, illustrated in FIG. 2A, is when LeftHat and RightHat are both null. However, in addition, several other states in which either or both of LeftHat and RightHat are non-null are also treated as logically empty deque encodings. FIGS. 2B, 2C and 2D illustrate such additional logically empty deque encodings. In the particular encodings illustrated, either a null-valued hat (LeftHat and RightHat) or a hat that points to a node with a corresponding self-pointer (e.g., LeftHat pointing to a node with a left pointer that is a self-pointer or RightHat pointing to a node with a right pointer that is a self-pointer) is indicative of a logically empty deque. Another encoding of an empty deque state wherein both the LeftHat and RightHat point to a marker or "Dummy" node is described in greater detail below.

Access Operations

The description that follows presents an exemplary non-blocking implementation of a deque based on an underlying doubly-linked-list data structure wherein access operations (illustratively, push_right, pop_right, push_left and pop_left) facilitate concurrent access. Exemplary code and illustrative drawings will provide persons of ordinary skill in the art with detailed understanding of one particular realization of the present invention; however, as will be apparent from the description herein and the breadth of the claims that follow, the invention is not limited thereto. Exemplary right-hand-side code is described in detail with the understanding that left-hand-side operations are symmetric. Use herein of directional signals (e.g., left and right) will be understood by persons of ordinary skill in the art to be somewhat arbitrary. Accordingly, many other notational conventions, such as top and bottom, first-end and second-end, etc., and implementations denominated therein are also suitable.

An illustrative push_right access operation in accordance with the present invention follows:

```
1    val push_right (val v) {
2       nd = new Node(); /* Allocate new Node structure */
3       if (nd == null) return "full";
4       nd→R = null;
5       nd→V = v;
6       while (true) {
7          rh = RightHat;
8          if (rh == null || ((rhR = rh→R) == rh)) {
9             nd→L = null;
10            lh = LeftHat;
11            if (DCAS(&RightHat, &LeftHat, rh, lh, nd, nd))
12               return "okay";
13         }
14         else {
15            nd→L = rh;
16            if (DCAS(&RightHat, &rh→R, rh, rhR, nd, nd))
17               return "okay";
18         }
19      }
20   }
```

The push_right operation first obtains a fresh Node structure from the storage allocator (line 2). We assume that if allocatable storage has been exhausted, the new operation will yield a null pointer. The push_right operation treats this as sufficient cause to report that the deque is full (line 3). Otherwise, the R field of the new node is set to null (line 4) and the value to be pushed is stored into the V field (line 5). All that remains is to splice this new node into the doubly linked chain. However, an attempt to splice may fail (because of an action taken by some other concurrent push or pop operation). Accordingly, a "while true" loop (line 6) is used to iterate until a splicing attempt succeeds.

The RightHat is copied into local variable rh (line 7). If rh is null or points to a node whose R field contains a self-pointer (line 8), then the deque is logically empty. In this case, the new node should become the only node in the deque. Its L field is set to null (line 9) and then a DCAS is used (line 11) to atomically make both RightHat and LeftHat point to the new node—but only if neither RightHat nor LeftHat has changed. If this DCAS operation succeeds, then the push has succeeded (line 12). If the DCAS fails, then operation of the "while true" loop will cause a retry.

If the deque is not logically empty, then the new node should be added to the right-hand end of the doubly linked chain. The copied content of the RightHat (stored locally in rh) is stored into the L field of the new node (line 15) and then a DCAS is used (line 16) to make both the RightHat and the former right-end node point to the new node, which thus becomes the new right-end node. If this DCAS operation succeeds, then the push has succeeded (line 17). If the DCAS fails, then operation of the "while true" loop will cause a retry.

An illustrative pop_right access operation in accordance with the present invention follows:

```
1    val pop_right() {
2       while (true) {
3          rh = RightHat;
4          lh = LeftHat;
5          if (rh == null) return "empty";
6          if (rh→R == rh)
7             if (DCAS(&RightHat, &rh→R, rh, rh, rh, rh))
8                return "empty";
9          else
10            continue; // go back to top of loop
11         }
12         if (rh == lh) {
13            if (DCAS(&RightHat, &LeftHat, rh, lh, null, null))
14               return rh→V;
15         }
16         else {
17            rhL = rh→L;
18            if (DCAS(&RightHat, &rh→L, rh, rhL, rhL, rh)) {
19               result = rh→V;
20               rh→R = null;
21               rh→V = null;
22               return result;
23            }
24         }
25      }
26   }
```

The right-side pop operation also uses a "while true" loop (line 2) to iterate until an attempt to pop succeeds. The RightHat is copied into local variable rh (line 3). If rh is null or points to a node whose R field contains a self-pointer, then the deque is logically empty and the pop operation reports that fact (line 5, line 8). Because changes are possible between the time we read the RightHat and the time we read the R pointer, we use a DCAS (line 7) to verify that these two pointers, are at the same moment, equal to the values individually read. If the deque is non-empty, there are two cases, depending on whether there is one element or more than one element in the deque. There is one element in the deque only if the LeftHat and RightHat point to the same node (line 12). As with the previously illustrated states, a variety of linked-list states may encode a one-element deque state. FIGS. 3A, 3B, 3C and 3D illustrate such one-element deque states. In the case of a one-element deque state, a DCAS operation is used to reset both hats to null (line 13). If the DCAS succeeds, then the pop succeeds and the value to be returned is in the V field of the popped node (line 14). In the realization above, it is assumed that, after completion of the pop_right operation, the node just popped will be reclaimed by an automatic storage reclamation facility, using garbage collection or some such technique. Another realization (described below) allows for explicit reclamation.

If there is more than one element in the deque, then the rightmost node should be removed from the doubly linked chain. A DCAS is used (line 18) to move the RightHat to the node to the immediate left of the rightmost node and to change the L field of that rightmost node to contain a self-pointer. A subtle point is that, in the above realization, the variable rhL, assigned in line 17, never contains a null pointer, even if nodes have been popped concurrently from the left-hand end of the deque. Accordingly, the DCAS in line 18 never changes RightHat to be a null pointer.

If the DCAS (line 18) fails, then operation of the "while true" loop will cause a retry. If the DCAS succeeds, then the pop succeeds and the value to be returned is in the V field of the popped node. Before this value is returned, the R field and the V field of the popped node are cleared. It is important to clear the R field (line 20) so that previously popped nodes may be reclaimed. It may be also desirable to clear the V field immediately (line 21) so that the popped value, if used quickly and then discarded by the caller, will not be retained indefinitely. If the V field does not contain a reference to other data structures, then line 21 may be omitted.

As described above, left variants of the above-described right push and pop operations are symmetric. However, for clarity, each is presented below. An illustrative push_left access operation in accordance with the present invention follows:

```
1    val push_left (val v) {
2        nd = new Node ( ); /* Allocate new Node structure */
3        if (nd == null) return "full";
4        nd→L = null;
5        nd→V = v;
6        while (true) {
7            lh = LeftHat;
8            if (lh == null ||((lhL = lh→L) == lh)) {
9                nd→R = null;
10               rh = RightHat;
11               if (DCAS(&LeftHat, &RightHat, lh, rh, nd, nd))
12                   return "okay";
13           }
14           else {
15               nd→R = lh;
16               if (DCAS(&LeftHat, &lh→L, lh, lhL, nd, nd))
17                   return "okay";
18           }
19       }
20   }
```

An illustrative pop_left access operation in accordance with the present invention follows:

```
1    val pop_left ()
2        while (true) {
3            lh = LeftHat;
4            rh = RightHat;
5            if (lh == null) return "empty";
6            if (lh→L == lh)
7                if (DCAS(&LeftHat, &lh→L, lh, lh, lh, lh))
8                    return "empty";
9                else
10                   continue; // go back to top of loop
11           }
12           if (lh == rh) {
13               if (DCAS(&LeftHat, &RightHat, lh, rh, null, null))
14                   return lh→V;
15           }
16           else {
17               lhR = lh→R;
18               if (DCAS(&LeftHat, &lh→R, lh, lhR, lhR, lh)) {
19                   result = lh→V;
20                   lh→L = null;
21                   lh→V = null;
22                   return result;
23               }
24           }
25       }
26   }
```

The push and pop operations work together in a relatively straightforward manner except in one odd case. If a pop_right operation and a pop_left operation occur concurrently when there are exactly two nodes in the deque, e.g., as illustrated in FIGS. 4A, 4B, 4C and 4D, then each operation may (correctly) discover that LeftHat and RightHat point to different nodes (see line 12 in the pop_right and pop_left realizations above) and therefore proceed to perform a DCAS for the multinode case (line 18 the pop_right and pop_left realizations above). Both of these DCAS operations may succeed, because they operate on disjoint pairs of memory locations. The result is that the hats pass each other as illustrated by the logically empty state of FIG. 2B.

Because there had been two nodes in the deque and both have been popped, the deque should be regarded as logically empty. The self-pointers encoded in respective left and right pointers of nodes identified by LeftHat and RightHat by operation of the pop_left and pop_right described above serve to identify the logically empty state to subsequent push and pop operations (see line 8 of push_right and push_left and lines 6 and 7 of pop_right and pop_left).

Self-Pointer Alternatives

Although self-pointers have been used throughout the access operations described above, persons of ordinary skill in the art will recognize that other distinguishing pointer values are also suitable. In general, it is suitable to compare appropriate list pointers (e.g., 1h->L for left-end access operations and rh->R for right-end access operations) with any distinguishing value that is guaranteed not to be employed in an interior list pointer. In short, use of self-pointers is convenient though not required.

For example, in one realization in accordance with the present invention, a "marker node" may be defined as follows:

```
Node Dummy = new Node ( );
```

In such a realization, the assignments of self-pointers and predicates that check for self-pointers in the above-described access operations may be replaced with assignments (e.g., by DCAS) of a pointer to the marker node and with predicates that check for such a marker node pointer.

Another improvement can be made by avoiding the use of the null encoding in the outward pointer(s) of a newly added (i.e., pushed) node. For example, in one realization in accordance with the present invention, a "marker node" may be defined as follows:

```
Node Dummy = new Node ( );
Dummy.R = Dummy;
Dummy.L = Dummy;
```

Then, let every occurrence of "null" in the above access operations (push_right, pop_right, push_left and pop_left), except those in line 3 of the push_right and push_left operations, be replaced with "Dummy". Then, the tests represented by the left-hand operands of all occurrences of || become redundant and may be removed (together with the || operators themselves). The modified push_right access operation:

```
1    val push_right (val v) {
2        nd = new Node( ); /* Allocate new Node structure */
3        if (nd == null) return "full";
4        nd→R = Dummy;
5        nd→V = v;
6        while (true) {
7            rh = RightHat;
8            if ((rhR = rh→R) == rh)) {
9                nd→L = Dummy;
10               lh = LeftHat;
11               if (DCAS(&RightHat, &LeftHat, rh, lh, nd, nd))
12                   return "okay";
13           }
14           else {
15               nd→L = rh;
16               if (DCAS(&RightHat, &rh→R, rh, rhR, nd, nd))
17                   return "okay";
18           }
19       }
20   }
``` and pop_right access operation:

```
1    val pop_right( ) {
2      while (true) {
3        rh = RightHat;
4        lh = LeftHat;
5        if (rh→R == rh) {
6          if (DCAS(&RightHat, &rh→R, rh, rh, rh, rh)
7            return "empty";
8          else
9            continue; // go back to top of loop
10       }
11       if (rh == lh) {
12         if (DCAS (&RightHat, &LeftHat, rh,
                    lh, Dummy, Dummy))
13           return rh→V;
14       }
15       else {
16         rhL = rh→L;
17         if (DCAS(&RightHat, &rh→L, rh, rhL, rhL, rh)) {
18           result = rh→V;
19           rh→R = Dummy;
20           rh→V = null;
21           return result;
22         }
23       }
24     }
25   }
``` are illustrative. Left variants of the above-described left push and pop operations are symmetric.

Use of a marker node and elimination of the null encoding in the outward pointer(s) of a newly added node allows a further variation, i.e., use of a null value in place of a self pointer, as a distinguishing pointer value. For example, a "marker node" may be defined as follows:

```
Node Dummy = new Node ( );
Dummy.R = null;
Dummy.L = null;
```

By making a corresponding modification to the push_right and pop_right access operations, self-pointers can be fully replaced with use of a null value as a distinguishing pointer value. For example, the push_right access operation may be rewritten as follows:

```
1    val push_right(val v) {
2      nd = new Node();   /* Allocate new Node structure */
3      if (nd == null) return "full";
4      nd->R = Dummy;
5      nd->V = v;
6      while (true) {
7        rh = RightHat;
8        if ((rhR = rh->R) == null)) {
9          nd->L = Dummy;
10         lh = LeftHat;
11         if (DCAS(&RightHat,&LeftHat,rh,lh,nd,nd))
12           return "okay";
13       }
14       else {
15         nd->L = rh;
16         if (DCAS(&RightHat,&rh->R,rh,rhR,nd,nd))
17           return "okay";
18       }
19     }
20   }
``` where the predicate in line 8 is modified to instead check for a null value as the distinguishing pointer value. The pop_right access operation is similarly modified:

```
1    val pop_right () {
2      while (true) {
3        rh = RightHat;
4        lh = LeftHat;
5        if (rh->R == null) {
6          if (DCAS(&RightHat,&rh->R,rh,null,rh,null)
7            return "empty";
8          else
9            continue; // go back to top of loop
10       }
11       if (rh == lh) {
12         if (DCAS(&RightHat,&LeftHat,rh,lh,Dummy,
                   Dummy))
13           return rh->V;
14       }
15       else {
16         rhL = rh->L;
17         if (rhL != null &&
18               DCAS(&RightHat,&rh->L,rh,rhL,rhL,
                     null)) {
19           result = rh->V;
20           rh->R = null;
21           rh->V = null;
22           return result;
23         }
24       }
25     }
26   }
``` where the predicate in line 5 is modified to instead check for a null value and the final operand of the DCAS operation in line 13 is modified to instead install a null value as the distinguishing pointer value. Because we have eliminated the self-pointers, it is possible to see a null value in rh->L. We avoid dereferencing in this case and instead retry. Elimination of self-pointers may have some benefit in some realizations in which the elimination of cycles facilitates reclamation of storage. One such explicit reclamation realization is described below.

Explicit Reclamation of Storage

While the above description has focused on implementations for execution environments that provide intrinsic support for automatic reclamation of storage, or garbage collection, some implementations in accordance with the present invention support explicit reclamation. This is important for several reasons. First, many common programming environments do not support garbage collection. Second, almost all of those that do provide garbage collection introduce excessive levels of synchronization overhead, such as locking and/or stop-the-world collection mechanisms. Accordingly, the scaling of such implementations is questionable. Finally, designs and implementations that depend on existence of a garbage collector cannot be used in the implementation of the garbage collector itself.

It has been discovered that a variation on the above-described techniques may be employed to provide explicit reclamation of nodes as they are severed from the deque as a result of pop access operations. The variation builds on a lock-free reference counting technique described in greater detail in U.S. patent application Ser. No. <not yet assigned> (docket 004-5723), entitled "LOCK FREE REFERENCE COUNTING," naming David L. Detlefs, Paul A. Martin, Mark S. Moir, and Guy L. Steele Jr. as inventors, and filed on even date herewith, which is incorporated herein in its entirety by reference.

As before, the deque is represented as a doubly-linked list of nodes, the leftmost and rightmost nodes in a non-empty deque are identified by LeftHat and RightHat, respectively, and a "marker node," Dummy, with null value left right pointers, is used as a sentinel node at one or both ends of the deque. On initialization, both LeftHat and RightHat are set to point to the marker node. To facilitate explicit reclamation, null pointers (rather than self-pointers) are used to as distinguishing pointer values so that reference cycles are avoided.

Since the null pointer implementation ensures that referencing cycles do not exist in or among nodes severed from the list, the implementation described is amenable to transformation to a GC-independent form using the lock-free reference counting (LFRC) methodology described in detail in the above-incorporated U.S. patent application. However, to summarize, (1) we added a reference count field rc to the node object, (2) we implemented an LFRCDestroy(v) function, (3) we ensured (using the null pointer implementation) that the implementation does not result in referencing cycles in or among garbage objects, (4, 5) we replaced accesses and manipulations of pointer variables with corresponding LFRC pointer operations and (6) we ensured that local pointer variables are initialized to NULL before being used with any of the LFRC operations and are properly destroyed using LFRCDestroy upon return (or when such local pointer variables otherwise go out of scope). LFRC pointer operations employed include LFRCLoad, LFRCStore, LFRCDCAS and LFRCDestroy. An illustrative implementation of each is described in detail in the above-incorporated U.S. Patent Application.

An illustrative push_right access operation in accordance with the present invention follows:

```
1    val push_right (val v) {
2         nd = new Node();    /* Allocate new Node structure */
3         rh = null; rhR = null; lh = null;
4         if (nd == null) {
5              LFRCDestroy(lh,rhR,rh,nd);
6              return "full";
7         }
8         LFRCStore(&nd->R,Dummy);
9         nd->V = v;
10        while (true) {
11             LFRCLoad(&RightHat,&rh);
12             LFRCLoad(&rh->R,&rhR);
13             if (rhR == null)) {
14                  LFRCStore(&nd->L,Dummy);
15                  LFRCLoad(&LeftHat,&lh);
16                  if (LFRCDCAS(&RightHat,&LeftHat,rh,lh,
                           nd,nd)) {
17                       LFRCDestroy(lh,rhR,rh,nd);
18                       return "okay";
19                  }
20             } else {
21                  LFRCStore(&nd->L,rh);
22                  if (LFRCDCAS (&RightHat,&rh->R,rh,rhR,
                           nd,nd)) {
23                       LFRCDestroy(lh,rhR,rh,nd);
24                       return "okay";
25                  }
26             }
27        }
28   }
``` where the notation LFRCDestroy (lh, rhR, rh, nd) is shorthand for operation of the LFRCDestroy operation on each of the listed operands.

An illustrative pop_right access operation in accordance with the present invention follows:

```
1    val pop_right() {
2         rh = null; lh = null; rhL = null; tmp = null;
3         while (true) {
4              LFRCLoad(&RightHat, &rh);
5              LFRCLoad(&LeftHat,&lh);
6              LFRCLoad(&rh->R,&tmp);
7              if (tmp == null)
8                   if (LFRCDCAS(&RightHat,&rh->R,rh,null,rh,
                            null)) {
9                        LFRCDestroy(tmp,rhL,lh,rh);
10                       return "empty";
11                  } else continue;
12             if (rh == lh) {
13                  if (LFRCDCAS (&RightHat,&LeftHat,rh,lh,
                            Dummy,Dummy)) {
14                       result = rh->V;
15                       LFRCDestroy(tmp,rhL,lh,rh);
16                       return result;
17                  }
18             } else {
19                  LFRCLoad(&rh->L,&rhL);
20                  if (rhL != null &&
21                       LFRCDCAS (&RightHat,&rh->L,rh,rhL,
                             rhL,null)) {
22                       result = rh->V;
23                       LFRCStore(&rh->R,null);
24                       LFRCDestroy(tmp,rhL,lh,rh);
25                       return result;
26                  }
27             }
28        }
29   }
``` wherein the LFRCDCAS pointer operation employed (at line 8) to ensure proper empty deque detection may optionally remain a DCAS primitive (as illustrated in the GC-dependent implementation). A DCAS primitive without LFRC support is possible because, whether or not successful, the DCAS does not alter any referencing state. Nonetheless, exemplary code above illustrates the LFRCDCAS pointer operation because some implementations may prefer to forgo such an optimization in favor of a simpler transformation from GC-dependent to explicitly-reclaimed form.

As before, it is possible to see a null value in rh->L and we avoid dereferencing in this case. Since this null value can only appear if the deque state changes while the pop_right operation is executing, we can safely retry without compromising lock-freedom. As described above, left variants of the above-described right push and pop operations are symmetric.

While the invention has been described with reference to various embodiments, it will be understood that these embodiments are illustrative and that the scope of the invention is not limited to them. Terms such as always, never, all, none, etc. are used herein to describe sets of consistent states presented by a given computational system. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while various full-function deque realizations have been described in detail, realizations implementations of other shared object data structures, including realizations that forgo some of access operations, e.g., for use as a FIFO, queue, LIFO, stack or hybrid structure, will also be appreciated by persons of ordinary skill in the art. In addition, more complex shared object structures may be defined that exploit the techniques described herein. Other synchronization primitives may be employed and a variety of distinguishing pointer values may be employed including without limitation, the self-referencing pointer values, marker node pointers and null pointers employed in some realizations described herein. In general, the particular data structures, synchronization primitives and distinguishing pointer values employed are implementation specific and, based on the description herein, persons of ordinary skill in the art will appreciate suitable selections for a given implementation.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

What is claimed is:

1. A computer implemented method of facilitating non-blocking access to a double-ended queue (deque) encoded using a doubly-linked-list of nodes and opposing-end identifiers, the method comprising:

defining linearizable push and pop operations operable on opposing-ends of the deque, wherein, for at least those deque states of two or more nodes, opposing-end executions of the pop operation include a linearizable synchronization operation on disjoint pairs of storage locations;

for at least those deque states of exactly two nodes, handling potentially concurrent execution of opposing-end pop operations by encoding a distinguishing pointer value in a popped node; and treating presence of the distinguishing pointer value in a node identified by one of the end identifiers as indicative of a logically empty deque.

2. The method of claim 1,
wherein the distinguishing pointer value includes a self-referencing pointer pointer value.

3. The method of claim 1,
wherein the distinguishing pointer value includes a null value.

4. The method of claim 1,
wherein the distinguishing pointer value identifies a marker node.

5. The method of claim 1,
wherein the linearizable synchronization operation is a double compare and swap operation.

6. The method of claim 1,
wherein the linearizable synchronization operation employs transactional memory.

7. The method of claim 1, wherein for those deque states of two or more nodes, the linearizable synchronization operation of left-end executions of the pop operation operates on a left-end one of the end identifiers and a right pointer of the node instantaneously identified thereby; and the linearizable synchronization operation of right-end executions of the pop operation operates on a right-end one of the end identifiers and a left pointer of the node instantaneously identified thereby.

8. The method of claim 1,
wherein an execution environment includes automatic reclamation of storage; and wherein execution of the pop operations includes severing a pointer chain to a previously popped node so that the severed, previously popped node may be reclaimed by the automatic reclamation of storage.

9. The method of claim 1, wherein execution of one of the pop operations includes:

severing a pointer chain to the node popped thereby; and
explicitly reclaiming the severed node.

10. The method of claim 9,
wherein the push and pop operations employ lock free reference counting pointer operations.

11. The method of claim 9, including the explicit reclamation, employed in the implementation of garbage collector.

12. A double-ended queue (deque) representation comprising:

a doubly-linked list encoded in addressable storage;

left- and right-end identifiers for respective ends to the list; and a computer readable encoding of opposing end push and pop operations, wherein executions of the opposing end pop operations are disjoint with respect to each other for deque states of two or more nodes, and wherein handling of potentially concurrent execution of the opposing end pop operations for a deque state of exactly two nodes includes encoding a distinguishing pointer value in a popped node and treating presence of the distinguishing pointer value in a node identified by one of the left- and right-end identifiers as indicative of a logically empty deque.

13. The deque representation of claim 12, wherein the opposing-end pop operations employ implementations of a linearizable synchronization primitive to mediate:

concurrent execution of same-end instances of the push and pop operations; and for single-node deque states, concurrent execution of opposing end instances of the push and pop operations.

14. The deque representation of claim 12,
wherein the distinguishing pointer value includes one of a self-pointer and a null value.

15. The deque representation of claim 12,
wherein the distinguishing pointer value identifies a marker node.

16. The deque representation of claim 12,
wherein the addressable storage is managed by a garbage collector; and wherein execution of pop operations includes severing a pointer chain to a previously popped node so that the severed, previously popped node may be reclaimed by the garbage collector.

17. The deque representation of claim 12,
wherein the push and pop operations employ lock-free reference counting pointer operations; and wherein execution of the push and pop operations includes explicit reclamation of a previously popped node severed from the list.

18. A computer implemented method of managing access to a doubly-linked list of nodes susceptible to concurrent removals from left and right ends thereof, the method comprising:

executing as part of a left remove-type operation, a linearizable synchronization operation to store a distinguishing pointer value in a right list pointer of a node removed thereby and to update a left-end identifier to identify a node to the right of the removed node; and executing as part of a right remove-type operation, a linearizable synchronization operation to store a distinguishing pointer value in a left list pointer of a node removed thereby and to update a right-end identifier to identify a node to the left of the removed node, wherein concurrent execution of left and right remove-type operations on a two-node state of the list is tolerated, at least in part, through treatment of the distinguishing pointer value in a right list pointer of a node identified by the right-end identifier or in a left list pointer of a node identified by the left-end identifier as indicative of a logically empty state of the list.

19. The method of claim 18, wherein the doubly-linked list of nodes encodes a double ended queue (deque);

wherein the left and right remove-type operations are left and right pop operations, respectively; and further comprising:

executing as part of a left push operation, a linearizable synchronization operation to store a pointer to a new node into both the left-end identifier and a left list pointer of the list node previously identified thereby; and executing as part of a right push operation, a linearizable synchronization operation to store a pointer to a new node into both the right-end identifier and a right list pointer of the list node previously identified thereby.

20. The method of claim 18, further comprising:

executing as part of a insert-type operation, a linearizable synchronization operation to store a pointer to a new node into both a respective one of the left- and right-end identifiers and a respective list pointer of the list node previously identified thereby.

21. A concurrent shared object representation comprising:

a sequence of zero or more values encoded in computer readable storage as a doubly-linked list of nodes, each having a pair of opposing-direction list pointers; and linearizable, non-blocking access operations defined for access to each of opposing ends of the sequence, the linearizable, non-blocking access operations including at least remove-type operations, wherein concurrent execution of opposing-end ones of the remove-type operations on a two-node state of the sequence is tolerated by employing a linearizable synchronization primitive to store a distinguishing pointer value in a respective one of the list pointers of a removed node and to update a respective one of opposing-end identifiers to identify a node adjacent to the removed node, and wherein presence of the distinguishing pointer value in a node identified by one of the opposing-end identifiers encodes a logically empty state of the concurrent shared object.

22. The concurrent shared object representation of claim 21, wherein the linearizable, non-blocking access operations further include an insert-type operation defined to operate at one of the ends of the sequence.

23. The concurrent shared object representation of claim 21, wherein the linearizable, non-blocking access operations further include insert-type operations defined to operate at each of the opposing ends of the sequence.

24. The concurrent shared object representation of claim 21, wherein the linearizable synchronization primitive includes one of:

a multi-way compare and swap; and use of a transactional memory facility.

25. A computer program product encoded in at least one computer readable medium, the computer program product comprising:

functional sequences implementing left- and right-end access operations on a double-ended concurrent shared object, the concurrent shared object instantiable as a doubly-linked-list delimited by a pair of left- and right-end identifiers, wherein instances of the functional sequences concurrently executable by plural execution units and each including a linearizable synchronization operation to mediate competing executions of the functional sequences, and wherein, for at least two-node states of the concurrent shared object, concurrent execution of left- and right-end remove-type access operations is handled by encoding a distinguishing pointer value in removed nodes and treating presence of the distinguishing pointer value in a node identified by a respective one of the end identifiers as indicative of a logically empty state of the concurrent shared object.

26. The computer program product of claim 25, wherein the access operations include:

the left- and right-end remove-type operations; and at least one insert-type operation.

27. The computer program product of claim 25, wherein the access operations include left- and right-end push and pop operations.

28. The computer program product of claim 25, further comprising:

functional sequences implementing a garbage collector and employing instantiations of the double-ended concurrent shared object in coordination thereof.

29. The computer program product of 25, wherein the at least one computer readable medium is selected from the set of a disk, tape or other magnetic, optical, or electronic storage medium and a network, wireline, wireless or other communications medium.

30. An apparatus comprising:

plural processors;

a one or more stores addressable by the plural processors;

first- and second-end identifiers accessible to each of the plural processors for identifying opposing ends of a doubly-linked list of nodes encoded in the one or more stores; and means for coordinating competing opposing-end pop operations on the doubly-linked list, including a two-node state thereof, the coordinating means employing instances of a linearizable synchronization operation and a distinguishing pointer value encoding indicative of a logically empty state of the doubly-linked list.

31. The apparatus of claim 30,
means for explicitly reclaiming a node severed from the list.

32. A double-ended concurrent shared object organized as a bi-directional referencing chain and including dynamic allocation of nodes thereof, the double-ended concurrent shared object employing a distinguishing pointer value to indicate an empty state thereof and supporting concurrent non-interfering opposing-end remove-type accesses for states of two or more nodes, the double-ended concurrent shared object, embodied as a doubly-linked list of nodes allocated from a shared memory of a multiprocessor and access operations executable by processors thereof.

33. The double-ended concurrent shared object of claim 32,
wherein those of the nodes that are severed from the referencing chain are explicitly reclaimed by operation of respective ones of the concurrent non-interfering opposing-end accesses.

34. The double-ended concurrent shared object of claim 32,
wherein those of the nodes that are severed from the referencing chain are reclaimed by an automatic storage reclamation facility of an execution environment.

35. A double-ended concurrent shared object organized as a bi-directional referencing chain and including dynamic allocation of nodes thereof, the double-ended concurrent shared object employing a distinguishing pointer value to indicate an empty state thereof and supporting concurrent non-interfering opposing-end remove-type accesses for states of two or more nodes, the double-ended concurrent shared object embodied as a computer program product encoded in media, the computer program product defining a data structure instantiable in shared memory of a multiprocessor and instructions executable thereby implementing access operations.

36. The double-ended concurrent shared object of claim 35,
wherein the data structure includes a double-ended queue; and
wherein the access operations include opposing-end variants of push and pop operations.

37. The double-ended concurrent shared object of claim 35,
wherein those of the nodes that are severed from the referencing chain are explicitly reclaimed by operation of respective ones of the concurrent non-interfering opposing-end accesses.

38. The double-ended concurrent shared object of claim 35,
wherein those of the nodes that are severed from the referencing chain are reclaimed by an automatic storage reclamation facility of an execution environment.

* * * * *